United States Patent [19]

Krings et al.

[11] Patent Number: 5,069,761
[45] Date of Patent: Dec. 3, 1991

[54] METHOD FOR PRETREATING THE CONNECTING ELEMENTS OF A GAS-TIGHT PIPE CONNECTION

[75] Inventors: Reiner Krings, Düsseldorf; Willy Schulte, Langenfeld, both of Fed. Rep. of Germany

[73] Assignee: Mannesmann Aktiengesellschaft, Düsseldorf, Fed. Rep. of Germany

[21] Appl. No.: 509,735

[22] Filed: Apr. 16, 1990

[30] Foreign Application Priority Data

Apr. 19, 1989 [DE] Fed. Rep. of Germany ....... 3913314

[51] Int. Cl.⁵ .................. C25D 7/04; B05D 7/22; F16L 9/14
[52] U.S. Cl. .................. 205/183; 427/239; 285/55; 285/94
[58] Field of Search ...................... 285/94, 55, 383, 94; 204/25, 45.1; 427/239

[56] References Cited

U.S. PATENT DOCUMENTS

| | | | |
|---|---|---|---|
| 4,538,840 | 9/1985 | DeLange | 285/333 |
| 4,630,849 | 12/1986 | Fukui et al. | 285/94 |
| 4,758,025 | 7/1988 | Frick | 285/94 |
| 4,871,194 | 10/1989 | Kawashima et al. | 285/94 |

Primary Examiner—John Niebling
Assistant Examiner—Kishor Mayekar
Attorney, Agent, or Firm—Cohen, Pontani & Lieberman

[57] ABSTRACT

Method for pretreating the connecting elements of a gas-tight pipe connection of the type including an internally threaded coupling for being screwed to externally threaded spigots at pipe ends to be joined, a metallic sealing seat, and an abutment shoulder. Only the coupling, on its innerside, is provided with a covering while leaving the spigots bare. After cleaning threaded and sealing regions of the connecting elements but before screwing together such connecting elements, a lubricant is applied to the cleaned threaded and sealing regions.

10 Claims, 2 Drawing Sheets

METHOD FOR PRETREATING THE CONNECTING ELEMENTS OF A GAS-TIGHT PIPE CONNECTION

BACKGROUND AND SUMMARY OF THE INVENTION

The present invention relates to a method for pretreating the connecting elements of a gas-tight pipe of the type including an internally threaded coupling for being screwed to externally threaded spigots at pipe ends to be joined, a metal sealing seat, and an abutment shoulder.

The pipe connection of a string of threaded pipes that can be screwed together for use in the petroleum and natural gas industries must, on one hand, support the weight of the string and, on the other hand, assure the tightness of the connection. In order to satisfy these requirements, the threaded section of pipe ends and of the coupling typically has, for instance, a conical API-thread with a corresponding covering. Due to the covering of the thread, high surface pressures are produced upon screwing together the coupling. In order to control such a heavy pressure load, surface coatings or greases that permit screwing together without galling have been developed. Such thread greases are lubricating pastes containing a high proportion of finely divided solid particles such as, for instance, graphite, metals or Teflon material. Aside from assuring easy screwing together, these greases promote hydraulic tightness of the connection (Erdöl, Erdgas 1983, pp. 293–296).

In gas-tight connections developed by various manufacturers, tightness of the connection is achieved through use of a covering in the metallic sealing seat. The abutment shoulders serve as a limitation for the screwing motion, and assure that the metallic sealing seat remains activated with an increasing string load. The conical thread accordingly need not assure any sealing function, and its object consists, in contrast to the API-thread, merely in transmitting the string load.

In order to be able reliably to screw gas-tight connections together, surface coatings and solid lubricating pastes have been used in the threaded and sealing-seat regions up to now in order to preclude galling and to make repeated screwing together possible. A main disadvantage of the us of solid lubricating pastes or screw greases for achieving gas-tight connections with conical threaded sections is that they produce a strong temporary sealing action in the region of the thread. As a consequence, if a gas-tight connection is tested for tightness after being screwed together, the result of the test fails to give a dependable prediction as to the tightness of the system; this is so although the measurement methods employed are capable of detecting leakage rates of less than one liter per year and the test pressures lie within the region of the minimum internal compressive strength of the connections. The test time, one to three minutes, available upon installation in the field typically is by far insufficient to dependably overcome the temporary seal produced by the screw grease. As experiments with regard to this have shown, gas-tightness is therefore very often merely simulated when thread greases are used. The experiments have furthermore shown that the pseudo-seal increases with an increase in the pipe diameter, due to the larger resistance of the thread caused by diameter and thread length.

In the past a large number of proposals have been made for solving the foregoing problem.

One proposal is to vary the amount of the API-thread grease applied, i.e. to apply very thin layers of grease. This proposal failed owing to lack of reproducibility of applying the thin layer of grease; this led to local reductions in thickness below the minimum layer of grease, resulting in galling.

Another proposal is directed towards reducing the viscosity of the thread grease by the admixture of solvents. In this case, it was found that the solvent fails to evaporate as rapidly as hoped for and, in the event of too great a dilution, the grease runs down from the region of the end of the thread, and galling occurs there.

In a further proposal, the coupling is treated with Molywell, a thread substance containing only a small proportion of solvents. Directly prior to the screwing together, the region of the thread is sprayed in addition with Teflon material. This proposal has the disadvantage of there being a high frictional value in the threads caused by the Molywell, so that only a reduced proportion of the total screwing moment remains for activating the sealing seat by the abutment shoulders. The possibility of permitting a higher screwing moment requires determining a correction factor which is difficult to ascertain for all types of loads and types of threads. Furthermore, this proposal is rather expensive since the prior treatment before the screwing together makes it necessary to have recourse to a specialized company.

Another, very expensive proposal relates to the use of ion implantation. In this process, ionized metals, for instance palladium, silver, chromium or gold, penetrate into the surface of the coupling. This expensive prior treatment is possible only at a specialized company and requires, for the user, expensive logistics and possible dependance on only one supplier.

An object of the present invention is to provide an improved method for the pretreatment of the connecting elements of a gas-tight pipe connection having a metallic sealing seat and an abutment shoulder that, on one hand, is inexpensive and permits simple handling upon the screwing and that, on the other hand, prevents galling even upon repeated screwing together and permits the tightness of the threaded connection to be checked in a reproducible and meaningful manner in a shorter time than previously.

The foregoing object is achieved, in brief, by a method for pretreating the connecting elements of a gas-tight pipe connection of the type including an internally threaded coupling for being screwed to externally threaded spigots at pipe ends to be joined, a metallic sealing seat and an abutment shoulder. The method comprises the steps of (i) cleaning threaded and sealing regions of the connection elements; (ii) before screwing together such connecting elements, applying a lubricant to the cleaned threaded and sealing regions; (iii) providing only the coupling, on its inner side, with a covering while leaving the spigots bare; and (iv) before screwing together the connecting elements, applying oil as a lubricant to the coupling and to the bare spigots.

The mentioned covering advantageously comprises a layer of manganese phosphate, or an electrolytically deposited element selected from the group of ductile of non-ferrous metals, such as tin or copper. The oil may be a motor oil or slide-path oil that is applied by brushing or by spraying. The method has particular applicability for pipe connections for use in the petroleum and natural gas industries.

The method of the invention is characterized by the fact that the pretreatment of the connecting elements is simple and inexpensive. Up to now it was customary to coat both the connecting element consisting of a coupling and a spigot with a layer of zinc phosphate in order to satisfy the requirements of API RP 37 with respect to repeated screwings. In accordance with the new proposal, only the coupling is pretreated and the spigot part remains bare. The cost advantage resulting therefrom is manifest.

The proposed coating, more specifically, consists preferably of a layer of manganese phosphate that is deposited chemically on the surface of the coupling by means of a combination of different baths. As compared with the zinc phosphate layer that was previously customary, the crystal structure of the manganese phosphate layer is very hard and has a fine grain. In addition to having a strong bonding adherence to the metal surface and a compact structure, this layer is very resistant to combined loads such as surface pressure and shearing force. Furthermore, the built-up layer is of very uniform thickness and is wear-resistant with respect to repeated screwings.

As an alternative to the layer of manganese phosphate, the coupling can also be coated with electrolytically deposited tin or copper. This alternative, with which comparable repeated screwings without galling can be achieved, is suitable in particular for high-alloy materials, such as ferritic, ferritic-austenitic and austenitic steels. With these steels, a layer of manganese phosphate cannot be built up due to the passivating tendency of the elements chromium and nickel.

A further advantage of the method of the invention is that, instead of the previously customary thread grease for the screwing, an oil is used as a lubricant. The application of the oil to the sealing seat and threaded regions of spigot and coupling by brushing or spraying is extremely simple and does not require any special knowledge on the part of the drill crew and, furthermore, does not require expensive special substances such as, for instance, Teflon material. The viscosity of the oil is within a range of <350 mm$^2$/sec at 40° Celsius, and preferably about 220 mm$^2$/sec at 40° Celsius or 20 mm$^2$/sec at 100° Celsius. Such viscosity prevents the oil from running off under extreme temperature conditions in hot climates so as to prevent galling on the end of the thread. Moreover, the use of oil avoids a temporary sealing action in the thread, so that the test gas used in a gas-tightness test flows through the threads within a short time and permits detection of a metallic sealing seat lacking in tightness. Since the detection takes place within a short time and in reproducible fashion, it is unnecessary to use the entire customary test holding time of three minutes. By the pretreatment of the invention, the test holding time can be at least halved, so that the cycle time on the derrick is reduced correspondingly. With increased depth of drilling, the importance of the previously effected gas seal test increases, since expense and costs increase greatly if the string must be raised from a depth of 3,000 meters and more due to leaking of a connection lying at the starting end. The additional expense for testing is, however, only worthwhile if (1) the result of the test can be obtained within a short time so that the cycle time on the derrick is not unnecessarily lengthened and (2) the result is reproducible and predictable and without simulation of pseudo-tightnesses.

BRIEF DESCRIPTION OF THE DRAWING

Other objects and advantages of the invention will become apparent from the following written description of the invention that refers to the accompanying drawing, in which.

DETAILED DESCRIPTION OF THE PREFERRED EMBODIMENTS

Figure 1A:
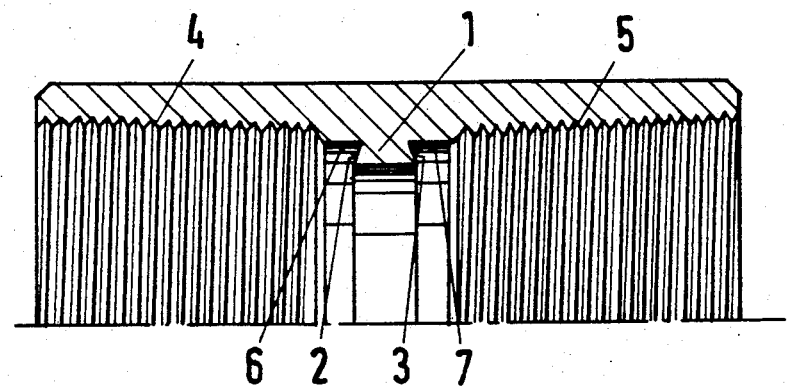
FIG. 1a is a partial longitudinal section through a pretreated coupling.
Figure 1B:
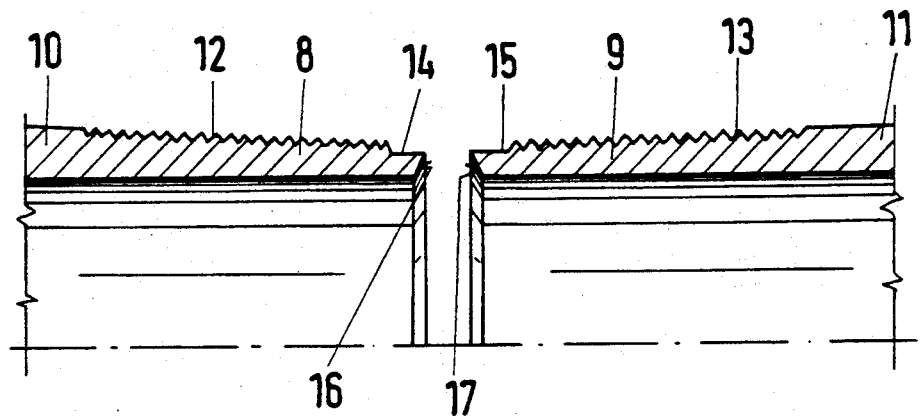
FIG. 1b is a partial longitudinal section through an untreated spigot.
Figure 1C:
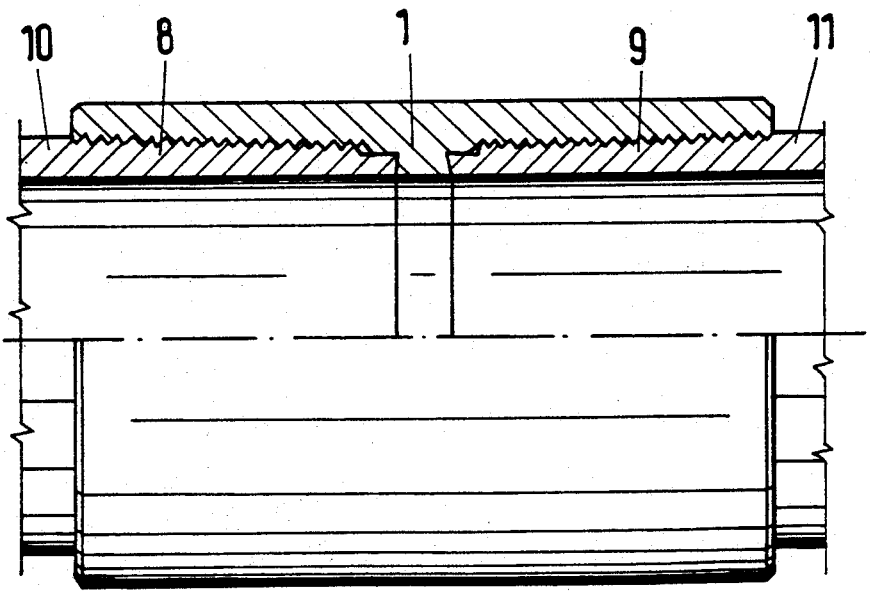
FIG. 1c is a partial longitudinal section and a front view of the pipe connection in a screwed state.

FIG. 1a is a partial longitudinal section through a pretreated coupling 1. After the prior chemical treatment, not shown here, the region of the seal seat 6, 7, both abutment shoulders 2, 3, as well as both threaded sections 4, 5, are coated with a layer of manganese phosphate. As shown in FIG. 1b, the connecting elements of the two pipes 10, 11 that are developed as spigots 8, 9 and are to be screwed together remain bare, i.e., without treatment. Each spigot element 8, 9 has a threaded section 12, 13, a sealing seat surface 14, 15 and an abutment shoulder 16, 17. Before screwing together, both the coupling 1 and the spigots 8, 9 are completely cleaned, whereupon all the connecting elements are brushed or sprayed with oil. FIG. 1c shows the pipe connection in a screwed-together state, with the sealing surfaces 14, 15 of the spigot elements 8, 9 (FIG. 1b) forming a metallic sealing seat together with the sealing surfaces 6, 7 of the coupling 1 (FIG. 1a).

The threaded sections 4, 5, 12, 13 are developed in complementary conical manner With respect to each other; however, the type of thread selected for such threaded sections is of minor importance for the method of the invention.

Figure 2:
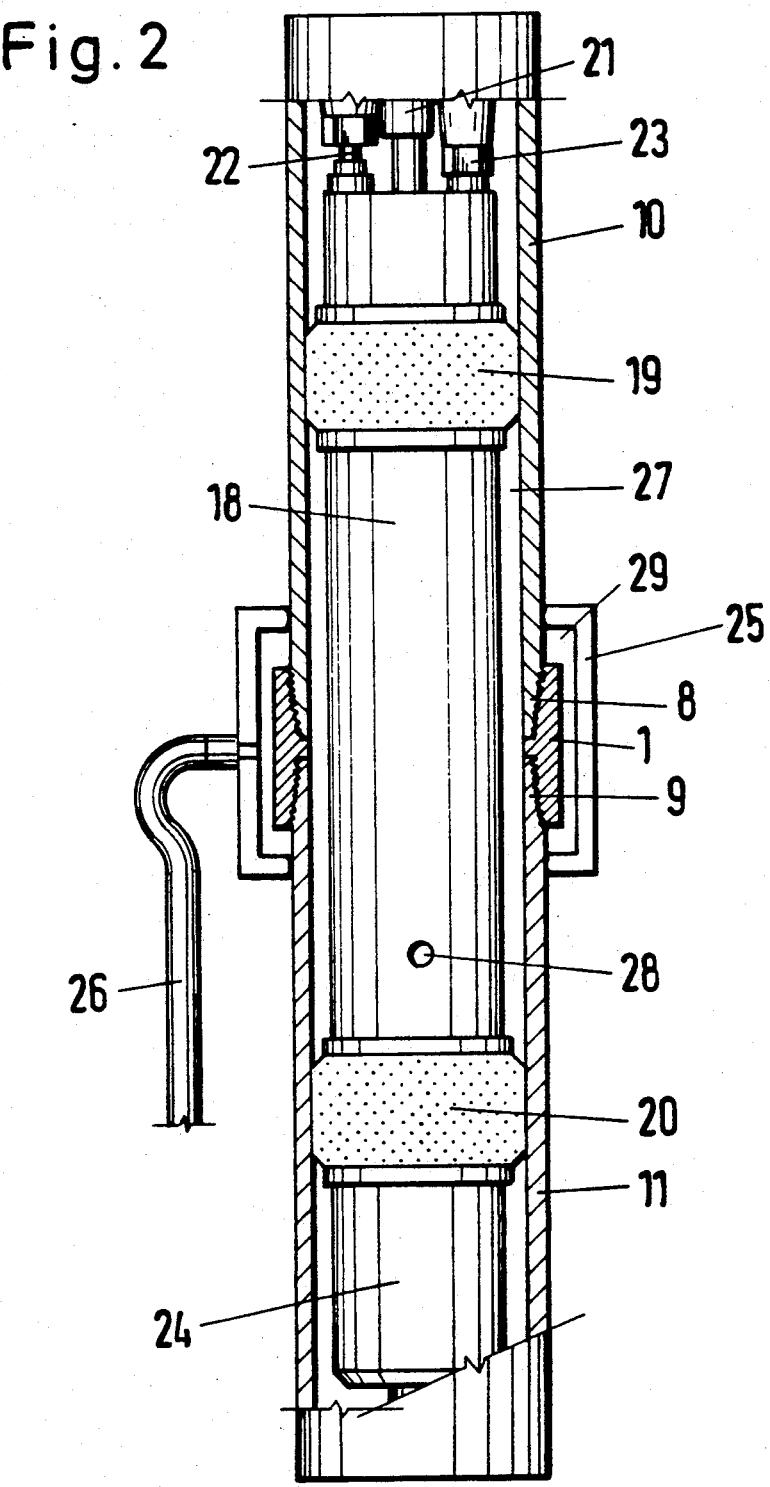
FIG. 2 is a longitudinal section through an arrangement for a gas-tightness test.

FIG. 2 is a longitudinal section through an arrangement for a gas-tightness test. After the screwing together, a test mandrel 18 having two packer elements 19, 20 spaced apart from each other is introduced through the upper-illustrated pipe 10, which is screwed into the coupling 1. The test mandrel 18 is connected at its upper end to a holding rod 21 and a hydraulic conduit 22 for setting the packer elements 19, 20 and to a test-gas conduit 23. At the lower end of the test mandrel 18 there is a guide 24 of hard rubber. Around the pipe connection there is placed a split jacket pipe 25 that has a connecting conduit 26 connected to a detector (not shown), such as a gas chromatograph. In order that the supplied test gas can flow into the annular space 27 formed by the remaining volume between the test mandrel 18 and the bore of the pipes 10, 11, the test mandrel 18 has at least one or more openings 28.

The test procedure proceeds in the manner that the annular space 27 is placed under pressure by the test gas supplied, for instance, at 125 bar, the hydraulically inflated packer elements 19, 20 assure the required seal toward the top and bottom. If the pipe connection should leak in the region of the metallic sealing seat, the test gas would flow through the threaded sections 4, 5, 12, 13 the are screwed together (see FIGS. 1a and 1b) and pass into the annular space 29 formed by the jacket pipe 25 and the outer surface of the pipe connection. From there it would be fed, via the conduit 26, to the detector which would then produce a corresponding indication.

It should be understood that the preferred embodiments and examples described are for illustrative purposes only and are not to be construed as limiting the scope of the present invention which is properly delineated only in the appended claims.

What is claimed is:

1. A method for pretreating the connecting elements of a gas-tight pipe connection of the type including an internally threaded coupling for being screwed to externally threaded spigots at pipe ends to be joined, a metallic sealing seat, and an abutment shoulder, the method comprising the steps of:
   a. surface cleaning the threaded and sealing regions of the connecting elements;
   b. providing only the coupling on its inner side with a covering while leaving the spigots bare; and
   c. before screwing together the connecting elements, applying oil as a lubricant to the covered coupling and bare spigots.

2. The method according to claim 1, wherein the covering comprises a layer of manganese phosphate.

3. The method according to claim 1, wherein the covering comprises an electrolytically deposited element selected from the group consisting of ductile non-ferrous metals.

4. The method according to claim 3, wherein the electrolytically deposited element is tin.

5. The method according to claim 3, wherein the electrolytically deposited element is copper.

6. The method according to claim 1, wherein the oil is a motor oil.

7. The method according to claim 1, wherein the oil is a slide-path oil.

8. The method according to claim 1, wherein the step of applying the oil comprises applying by brush.

9. The method according to claim 1, wherein the step of applying the oil comprises applying by spraying.

10. The method according to claim 1, wherein the pipe connection is adapted for use in the petroleum and natural gas industries.

* * * * *